United States Patent
Takayashiki

(10) Patent No.: US 9,550,252 B2
(45) Date of Patent: Jan. 24, 2017

(54) ULTRASONIC JOINTING METHOD

(71) Applicant: Yazaki Corporation, Minato-ku, Tokyo (JP)

(72) Inventor: Yousuke Takayashiki, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 567 days.

(21) Appl. No.: 14/026,396

(22) Filed: Sep. 13, 2013

(65) Prior Publication Data

US 2014/0014709 A1    Jan. 16, 2014

Related U.S. Application Data

(63) Continuation of application No. PCT/JP2012/057413, filed on Mar. 15, 2012.

(30) Foreign Application Priority Data

Mar. 15, 2011  (JP) .................................. 2011-056166

(51) Int. Cl.
 *B23K 1/06* (2006.01)
 *B23K 20/10* (2006.01)
 *H01R 4/02* (2006.01)
 *H01R 43/02* (2006.01)

(52) U.S. Cl.
 CPC ............. *B23K 20/10* (2013.01); *B23K 20/106* (2013.01); *H01R 4/023* (2013.01); *H01R 43/0207* (2013.01)

(58) Field of Classification Search
 None
 See application file for complete search history.

(56) References Cited

U.S. PATENT DOCUMENTS

| | | | | |
|---|---|---|---|---|
| 3,367,809 A | * | 2/1968 | Soloff | 156/73.1 |
| 3,531,852 A | * | 10/1970 | Dominick, Jr. et al. | 228/110.1 |
| 3,822,465 A | * | 7/1974 | Frankort et al. | 228/111 |
| 5,096,532 A | * | 3/1992 | Neuwirth et al. | 156/580.1 |
| 5,180,093 A | * | 1/1993 | Stansbury et al. | 228/1.1 |

(Continued)

FOREIGN PATENT DOCUMENTS

| CN | 101772866 A | 7/2010 |
|---|---|---|
| CN | 101855796 A | 10/2010 |

(Continued)

OTHER PUBLICATIONS

Machine translation of Goto (JP-2000-202642A) (no date available).*

(Continued)

*Primary Examiner* — Kiley Stoner
(74) *Attorney, Agent, or Firm* — Banner & Witcoff, Ltd.

(57) ABSTRACT

An ultrasonic jointing method is provided for performing an ultrasonic joint of a conductor part which is exposed by removing a coating of an electric wire with respect to a terminal. The ultrasonic jointing method includes: holding the conductor part of the electric wire and the terminal between an anvil and a horn in which a concave part is formed; and applying an ultrasonic vibration to the conductor part of the electric wire and the terminal that are held between the anvil and the horn. The conductor part is received in the concave part which has a space area of 0.89 to 1.46 times as large as a cross-sectional area of the conductor part of the electric wire.

6 Claims, 6 Drawing Sheets

(56) References Cited

U.S. PATENT DOCUMENTS

| | | | |
|---|---|---|---|
| 5,193,732 A * | 3/1993 | Interrante et al. | 228/1.1 |
| 5,868,301 A * | 2/1999 | Distefano et al. | 228/180.21 |
| 6,100,511 A * | 8/2000 | Kempe | 219/679 |
| 6,184,471 B1 * | 2/2001 | Asakura et al. | 174/78 |
| 2002/0130159 A1 * | 9/2002 | Kondo | 228/110.1 |
| 2004/0020580 A1 * | 2/2004 | Oishi et al. | 156/73.1 |
| 2004/0088857 A1 * | 5/2004 | Fujimoto et al. | 29/871 |
| 2004/0232208 A1 * | 11/2004 | Kondo | 228/110.1 |
| 2006/0169742 A1 | 8/2006 | Fujimoto et al. | |
| 2006/0208033 A1 * | 9/2006 | Welter | 228/110.1 |
| 2010/0170935 A1 * | 7/2010 | Stroh et al. | 228/110.1 |
| 2010/0320255 A1 * | 12/2010 | Sato et al. | 228/1.1 |
| 2011/0062218 A1 * | 3/2011 | Ohnuma | 228/110.1 |
| 2011/0296683 A1 * | 12/2011 | Takayashiki et al. | 29/872 |
| 2012/0125520 A1 * | 5/2012 | Yoshida et al. | 156/64 |
| 2012/0125976 A1 * | 5/2012 | Steiner | 228/110.1 |

FOREIGN PATENT DOCUMENTS

| | | |
|---|---|---|
| DE | 10 2007 026 707 B3 | 9/2008 |
| JP | H0622557 Y2 | 6/1994 |
| JP | 2000-107872 A | 4/2000 |
| JP | 2000-202642 A | 7/2000 |
| JP | 2002026540 A | 1/2002 |
| JP | 2005-319497 A | 11/2005 |
| JP | 2006-172927 A | 6/2006 |
| JP | 2010-528867 A | 8/2010 |
| JP | 2010201481 A | 9/2010 |

OTHER PUBLICATIONS

International Search Report received in corresponding International Application No. PCT/JP2012/057413 mailed Jun. 26, 2012.
Aug. 27, 2015—(CN) Notification of Second Office Action—App 201280012855.5—Eng Tran.
Sep. 8, 2015—(JP) Decision of Refusal—App 2011056166—Eng Tran.
Mar. 9, 2015—(CN) Notification of the First Office Action—App 201280012855.5—Eng Tran.
May 19, 2015—(JP) Notification of Reasons for Refusal—App 2011056166.

* cited by examiner

ULTRASONIC JOINTING METHOD

CROSS REFERENCE TO RELATED APPLICATIONS

This application is a continuation of PCT application No. PCT/JP2012/057413, which was filed on Mar. 15, 2012 based on Japanese Patent Application (No. 2011-056166) filed on Mar. 15, 2011, the contents of which are incorporated herein by reference.

BACKGROUND OF THE INVENTION

1. Field of the Invention

The present invention relates to an ultrasonic jointing method.

2. Description of the Related Art

An ultrasonic jointing method for jointing an electric wire with a terminal is known in which a conductor part of the electric wire and the terminal are held between a horn and an anvil, and the oxidation film and stains on the surface of the conductor part of the electric wire are removed by being applied ultrasonic vibration.

It is known that in the above ultrasonic jointing method, in order to prevent the jointing strength from decreasing due to the decrease of the cross-sectional area of the conductor part in the jointing region of the conductor part and the terminal, the ultrasonic jointing can be performed after pressing on the conductor part beforehand (referring to JP-A-2006-172927). Besides, it is known that in the above ultrasonic jointing method, in order to prevent that the pressing force of the central part of the horn becomes large and the pressing force of both side parts becomes small when the ultrasonic jointing is being performed, the pressing forces can be equalized by providing protrusions at the both side parts of the horn (referring to JP-A-2005-319497).

SUMMARY OF THE INVENTION

In the ultrasonic jointing method described in JP-A-2006-172927, to prevent the jointing strength from decreasing, pressing must be performed beforehand. Thus, it is unavoidable to provide a procedure for pressing, and necessary to provide a pressing device. Further, in the ultrasonic jointing method described in JP-A-2006-172927, burrs may be created between the horn and the terminal. In addition, burrs may be created even in the ultrasonic jointing method described in JP-A-2005-319497.

The present invention is accomplished to solve the above problems, and an object of the invention is to provide an ultrasonic jointing method so that the jointing strength can be prevented from decreasing while the occurrence of burrs can be inhibited.

An aspect of the present invention provides an ultrasonic jointing method for performing an ultrasonic joint of a conductor part which is exposed by removing a coating of an electric wire with respect to a terminal, the ultrasonic jointing method including: holding the conductor part of the electric wire and the terminal between an anvil and a horn in which a concave part is formed; and applying an ultrasonic vibration to the conductor part of the electric wire and the terminal that are held between the anvil and the horn, wherein the conductor part is received in the concave part which has a space area of 0.89 to 1.46 times as large as a cross-sectional area of the conductor part of the electric wire.

According to the ultrasonic jointing method, a first step of holding the conductor part of the electric wire and the terminal between the anvil and the horn in which the concave part is formed is included. In the first step, the conductor part is received in the concave part which has a space area of 0.89-1.46 times as large as the cross-sectional area of the conductor part of the electric wire. Here, it is found that a jointing strength of more than 60 MPa can be obtained by receiving the conductor part in the concave part which has a space area of 0.89-1.46 times as large as the cross-sectional area of the conductor part of the electric wire, and applying ultrasonic vibration. Further, it is found that when the conductor part is received in the concave part having a space area of the above range and ultrasonic vibration is applied, the amount of burrs is 0 $mm^3$. Therefore, while the jointing strength can be prevented from decreasing, the occurrence of burrs can be inhibited.

Further, the terminal may have a flat-plate shape that excludes sidewalls for restricting movement of the conductor part on a surface that faces the conductor part of the electric wire.

According to the ultrasonic jointing method, the conductor part of the electric wire and the flat board-shaped terminal which excludes sidewalls on the surface that faces the conductor part are held. Because the horn receives the conductor part in the concave part, even if the terminal does not have sidewalls, the conductor part can be prevented from moving away laterally by the load added by the horn, and the terminal which does not have sidewalls can be ultrasonically jointed.

Further, the concave part may have, in cross-section, either a trapezoidal shape or a semicircular shape.

Moreover, the concave part may have a trapezoidal shape in one cross-section and a semi-circular shape in another cross-section.

According to the aspects of the present invention, it is possible to provide an ultrasonic jointing method so that the jointing strength can be prevented from decreasing while the occurrence of burrs can be inhibited. Further, the ultrasonic jointing can be performed on the terminal which excludes sidewalls to meet the requirement of saving space and reducing the loss of manufacturing members, without performing preprocesses.

BRIEF DESCRIPTION OF THE DRAWINGS

FIGS. 3A, 3B and 3C are schematic diagrams which show states of the ultrasonic jointing of a horn in a related art, in which FIG. 3A shows a state at the time of the ultrasonic jointing, FIG. 3B shows a conductor part and a terminal after the ultrasonic jointing, and FIG. 3C shows an IIIC-IIIC cross-section of FIG. 3B.

FIGS. 4A, 4B and 4C are schematic diagrams which show the states of the ultrasonic jointing of a horn according to the embodiment of the present embodiment, in which FIG. 4A shows a state at the time of the ultrasonic jointing, FIG. 4B shows a conductor part and a terminal after the ultrasonic jointing, and FIG. 4C shows an IVC-IVC cross-section of FIG. 4B.

DETAILED DESCRIPTION OF THE EXEMPLARY EMBODIMENTS

Figure 1:
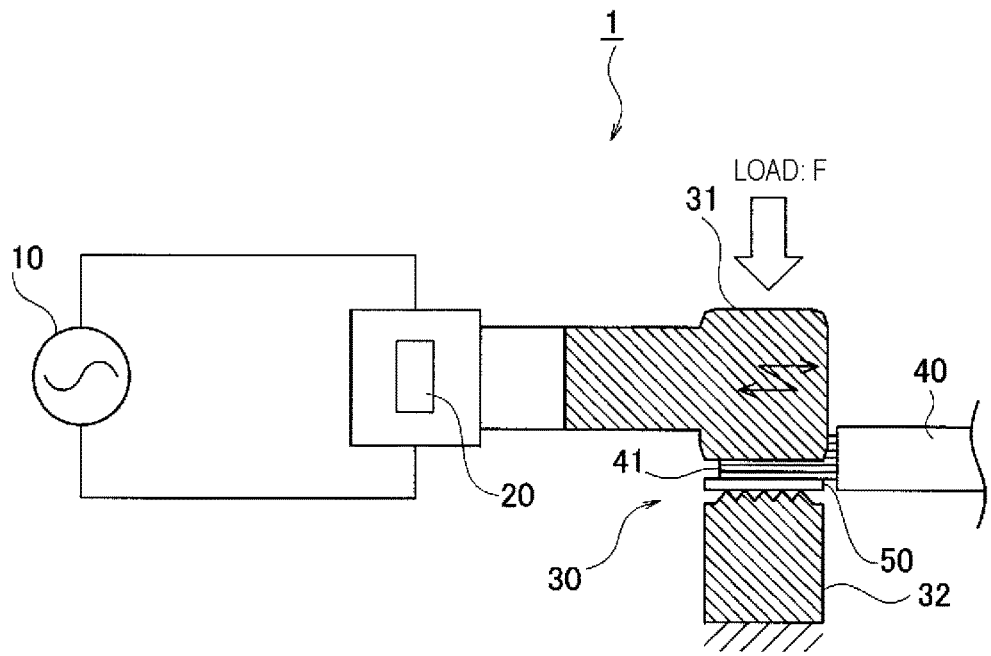
FIG. 1 is a schematic diagram which shows an example of an ultrasonic jointing device to perform an ultrasonic welding method according to an embodiment of the present invention.

Next, an embodiment of the present invention is described with reference to the drawings. FIG. 1 is a schematic diagram which shows an example of an ultrasonic jointing device 1 to perform an ultrasonic welding method according to the embodiment of the present invention. The ultrasonic jointing device 1 shown in FIG. 1 ultrasonically joints a conductor part 41, which is exposed by removing a coating of an electric wire 40, to a terminal 50, and schematically includes a power supply 10, a vibrator 20 and an ultrasonic jointing part 30.

The power supply 10 is an AC power supply to perform the ultrasonic jointing in the ultrasonic jointing part 30. The vibrator 20 is vibrated by an alternating current from the power supply 10. The ultrasonic jointing part 30 has a horn 31 and an anvil 32 and joints the conductor part 41 and the terminal 50 as follows. The ultrasonic jointing part 30 holds the conductor part 41 of the electric wire 40 and the terminal 50 between the horn 31 and the anvil 32, and the horn 31 is caused to vibrate by the vibrator 20 to propagate ultrasonic vibration energy in the ultrasonic jointing part.

Figure 2:
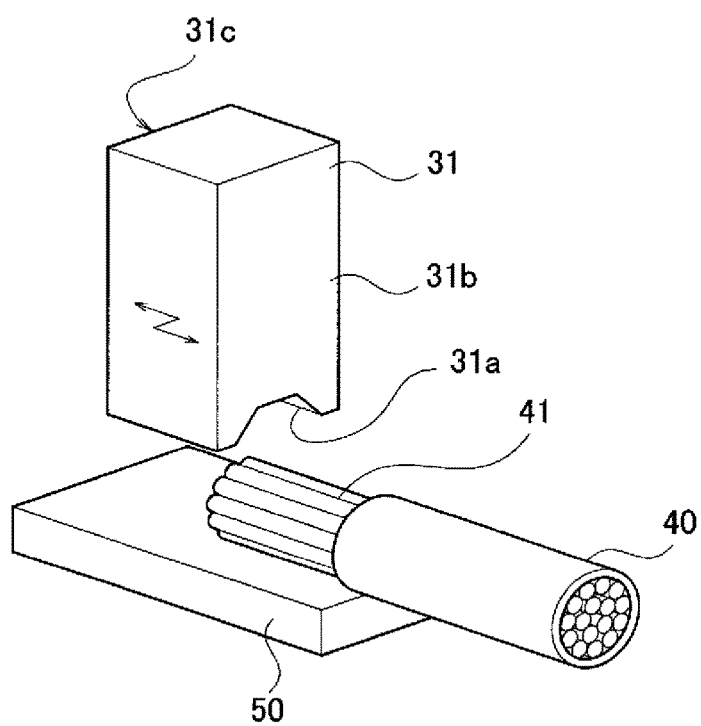
FIG. 2 is an enlarged perspective view which shows main parts of the ultrasonic jointing part of the ultrasonic jointing device shown in FIG. 1.

FIG. 2 is an enlarged perspective view which shows main parts of the ultrasonic jointing part 30 of the ultrasonic jointing device 1 shown in FIG. 1. A concave part 31a is formed at the surface of the horn 31 that contacts with the conductor part 41. When the ultrasonic vibration is applied, the horn 31 receives the conductor part 41 of the electric wire 40 in the concave part 31a. Further, in the embodiment, the terminal 50 is formed of a flat board, and excludes sidewalls (i.e., barrel). It is clear from FIG. 2 that the concave part 31a is formed continuously from the side surface 31b of the horn 31 to the opposite side surface 31c, in order to receive the conductor part 41 of the electric wire 40 along the longitudinal direction in the surface of the horn 31 that contacts with the conductor part 41.

An ultrasonic jointing method of the above ultrasonic welding device 1 includes a first step of holding the conductor part 41 of the electric wire 40 and the terminal 50 between the horn 31 in which the concave part 31a is formed and the anvil 32, and a second step of applying ultrasonic vibration to the conductor part 41 of the electric wire 40 that are held in the first step to perform ultrasonic joint.

Figure 3A:
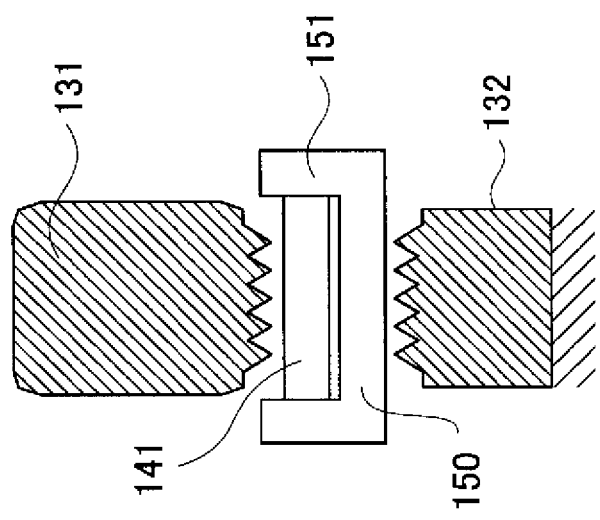
Figure 3B:
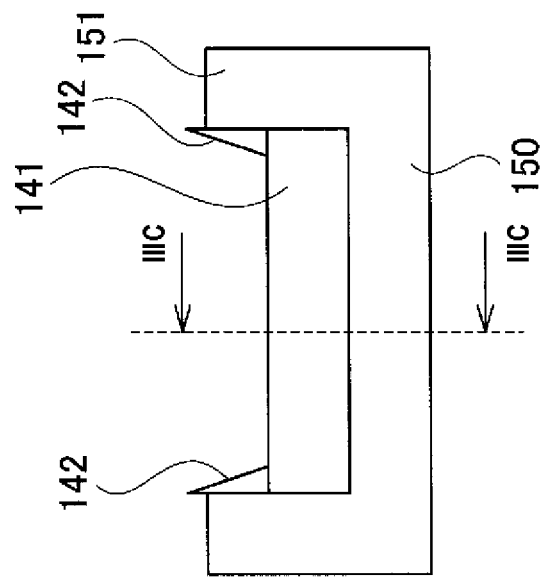
Figure 3C:
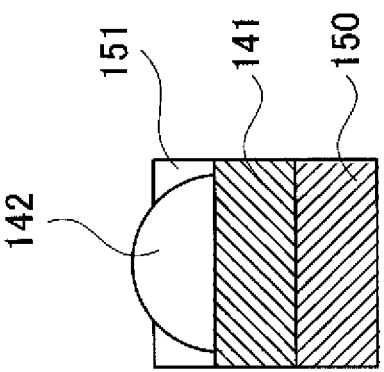

FIGS. 3A-3C are schematic diagrams which show states of the ultrasonic jointing of a horn in a related art, in which FIG. 3A shows a state at the time of the ultrasonic jointing, FIG. 3B shows a conductor part and a terminal after the ultrasonic jointing, and FIG. 3C shows an IIIC-IIIC cross-section of FIG. 3B.

As shown in FIG. 3A, a conductor part 141 and a terminal 150 are held between a horn 131 and an anvil 132, and ultrasonic vibration is applied. However, the horn 131 does not have a part corresponding to the concave part 31a. Therefore, the conductor part 141 is not received in the concave part, and in order to prevent the conductor part 141 from moving away laterally at the time of the ultrasonic jointing, sidewalls 151 of the terminal 150 are necessary.

When the ultrasonic jointing is performed by such a method, as shown in FIGS. 3B and 3C, burrs 142 occur in gaps between the horn 131 and the sidewalls 151 of terminal 150. When the burrs 142 occur, other parts may be damaged, and when the burrs 142 drop and touch other conducting parts, a short circuit may be caused.

Figure 4C:
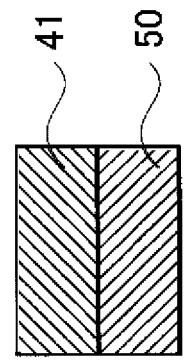
Figure 4B:
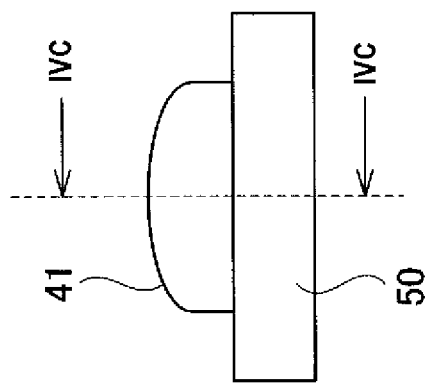
Figure 4A:
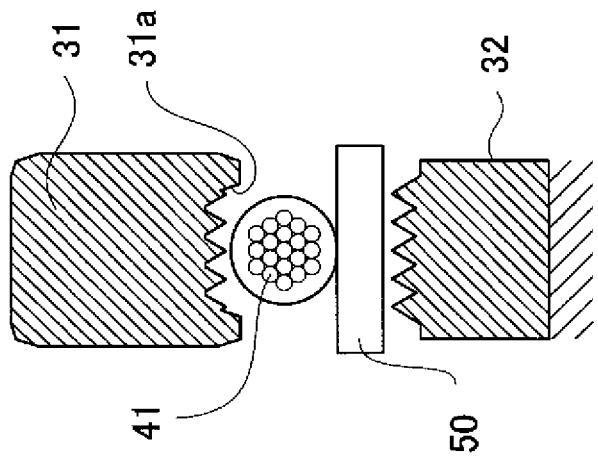

FIGS. 4A-4C are schematic diagrams which show states of the ultrasonic jointing of the horn 31 according to the embodiment, in which FIG. 4A shows a state at the time of the ultrasonic jointing, FIG. 4B shows the conductor part and the terminal after the ultrasonic jointing, and FIG. 4C shows an IVC-IVC cross-section of FIG. 4B.

As shown in FIG. 4A, the horn 31 according to the present embodiment has the concave part 31a. Therefore, the conductor part 41 is received in the concave part 31a. Even if the terminal 50 does not have sidewalls, the conductor part 41 can be prevented from moving away laterally by the load added by the horn 31. The terminal 50 which excludes sidewalls can be ultrasonically jointed.

Further, when the ultrasonic jointing is performed by the method according to the present embodiment, as shown in FIGS. 4B and 4C, the occurrence of burrs is inhibited. Besides, the decrease of the jointing strength is also inhibited. These are accomplished by setting the concave part 31a to a predetermined size.

Figure 5:
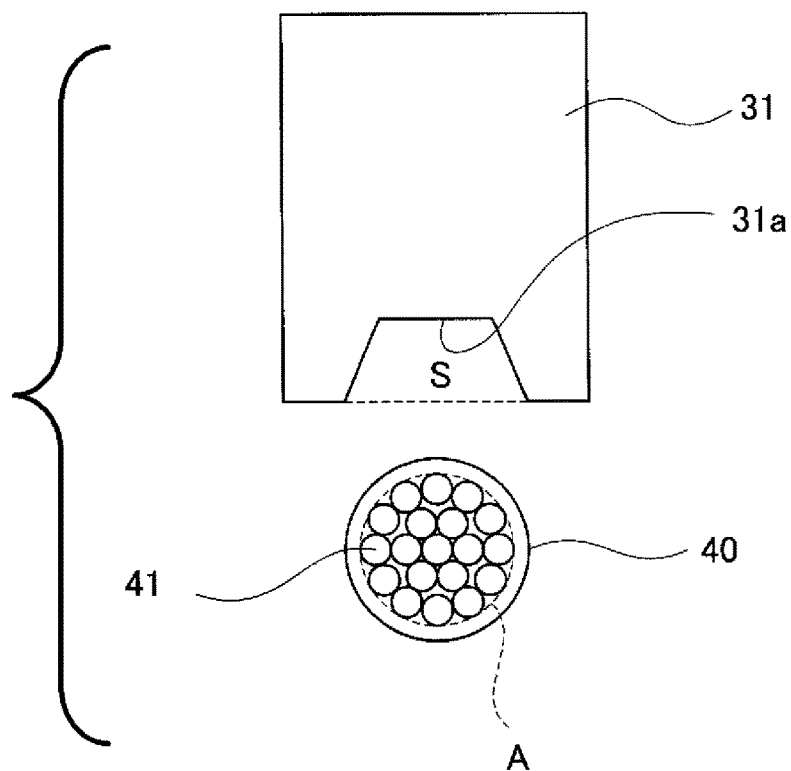
FIG. 5 is a schematic side view which shows the relation of a concave part of the horn and the conductor part of an electric wire according to the embodiment.

FIG. 5 is a schematic side view which shows the relation of the concave part 31a of the horn 31 and the conductor part 41 of the electric wire 40 according to the present embodiment. As shown in FIG. 5, the concave part 31a is formed in the horn 31 along a longitudinal direction of the electric wire 40. Where an area formed by the space when the horn 31 is viewed in the longitudinal direction is assumed as S and the cross-sectional area of the conductor part 41 is A, the wire filling factor X (=A/S*100)(%) is shown as follows.

Figure 6:
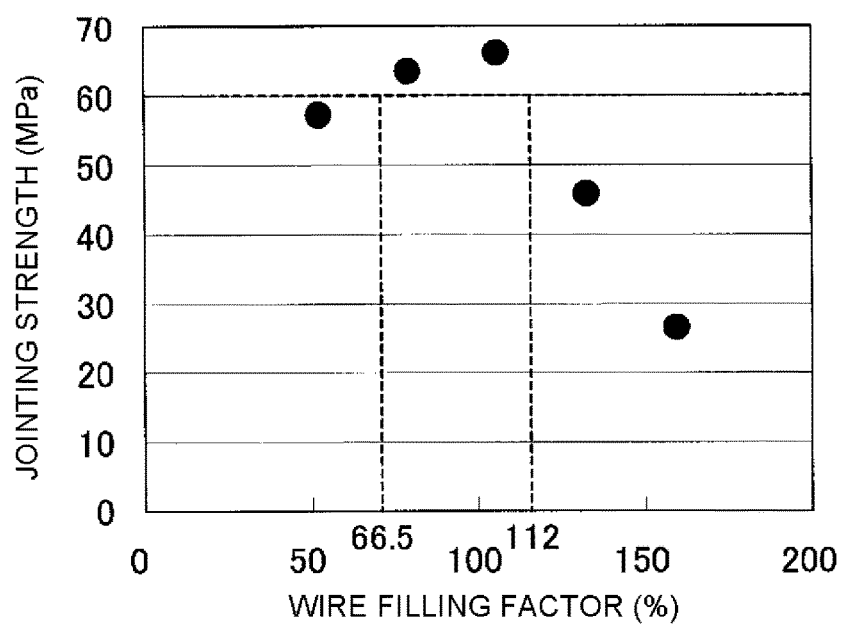
FIG. 6 is a graph which shows the relation of wire filling factor (%) and jointing strength (MPa).

FIG. 6 is a graph which shows the relation of the wire filling factor (%) and the jointing strength (MPa). The example shown in FIG. 6 indicates a result in which the jointing strength is measured when the space area S is fixed at 6 $mm^2$, and the cross-sectional area of the conductor part 41 is varied. As shown in FIG. 6, when the wire filling factor X is 52%, the jointing strength is about 58 MPa. Further, when the wire filling factor X is approximately 80%, the jointing strength is 63 MPa, and when the wire filling factor X is 112%, the jointing strength is 66 MPa. Further, when the wire filling factor X is approximately 132%, the jointing strength is 46 MPa, and when the wire filling factor X is approximately 157%, the jointing strength is 27 MPa.

It is found that, in order to ensure that the jointing strengths is more than 60 MPa, the wire filling factor X should be more than 66.5% and less than 112%. Therefore, it is found that, if the concave part 31a is so provided that the wire filling factor X is more than 66.5% and less than 112%, the jointing strengths can be ensured to be more than 60 MPa.

Figure 7:
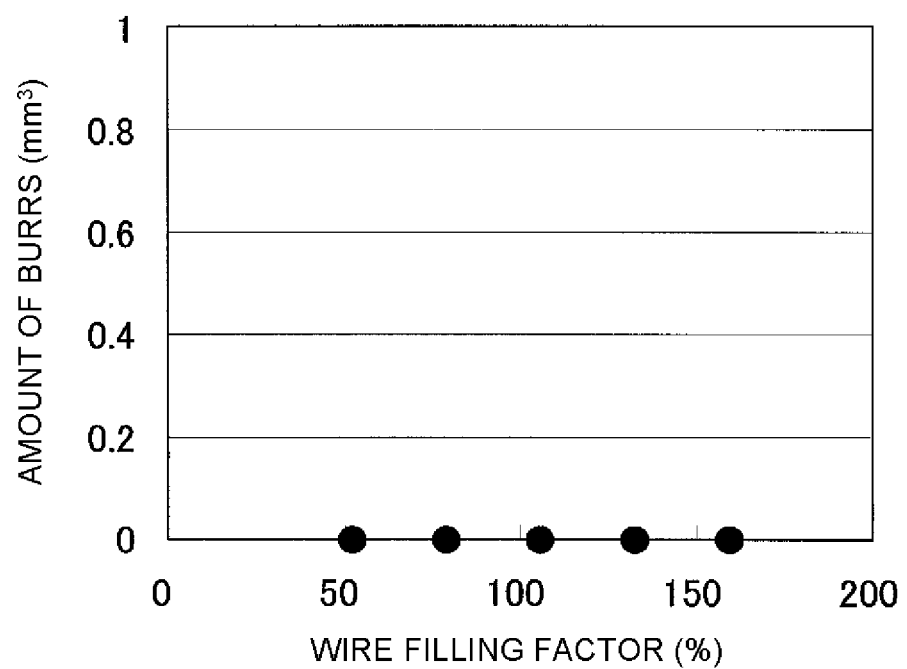
FIG. 7 is a graph which shows the relation of wire filling factor (%) and amount of burrs ($mm^3$).

FIG. 7 is a graph which shows the relation of the wire filling factor (%) and the amount of burrs ($mm^3$). Similarly to the measurement of FIG. 6, the example shown in FIG. 7 indicates a result in which the amount of burrs is measured when the space area S is fixed at 6 mm$^2$, and the cross-sectional area of the conductor part 41 is varied. As shown in FIG. 7, when the wire filling factor X is 52%, approximately 80%, 112%, approximately 132% and 157%, the amount of burrs is 0 mm$^3$.

Therefore, it is found that, if the concave part 31a is so provided that the wire filling factor X is more than 52% and less than 157%, the occurrence of burrs can be inhibited.

Thus, in order to prevent the jointing strength from decreasing and to inhibit the occurrence of burrs, the concave part 31a should be so provided that the wire filling factor X is more than 66.5% and less than 112%. That is, in the embodiment, it can be said that the concave part 31a should have a space area S of 0.89 (1/1.12) to 1.46 (1/0.665) times as large as that of the conductor part 41 of the electric wire 40.

Therefore, the ultrasonic jointing method according to the present embodiment includes a first step of holding the conductor part 41 of the electric wire 40 and the terminal 50 between the anvil 32 and the horn 31 in which the concave part 31a is formed. In the first step, the conductor part 41 is received in the concave part 31a which has a space area S of 0.89 to 1.46 times as large as the cross-sectional area of the conductor part 41 of the electric wire 40. Here, it is found that a jointing strength of more than 60 MPa can be obtained by receiving the conductor part 41 in the concave part 31a which has a space area S of 0.89 to 1.46 times as large as the cross-sectional area of the conductor part 41 of the electric wire 40, and applying ultrasonic vibration. Further, it is found that when the conductor part 41 is received in the concave part 31a having a space area S of the above range and ultrasonic vibration is applied, the amount of burrs is 0 mm$^3$. Therefore, while the jointing strength can be prevented from decreasing, the occurrence of burrs can be inhibited.

Further, the conductor part 41 of the electric wire 40 and the flat board-shaped terminal 50 which excludes sidewalls are held. Because the horn 31 receives the conductor part 41 in the concave part 31a, even if the terminal 50 does not have sidewalls, the conductor part 41 can be prevented from moving away laterally by the load added by the horn 31, and the terminal 50 which excludes sidewalls can be ultrasonically jointed.

Although a horn in which a concave part is formed at the surface of the horn that contacts with the conductor part of the electric wire is disclosed in JP-A-2000-202642, even if the ultrasonic jointing method as described in this disclosure is considered, it is not mentioned that the relation of the concave part and the conductor part may result in the decreasing of the jointing strength and the occurrence of burrs.

Figure 8:
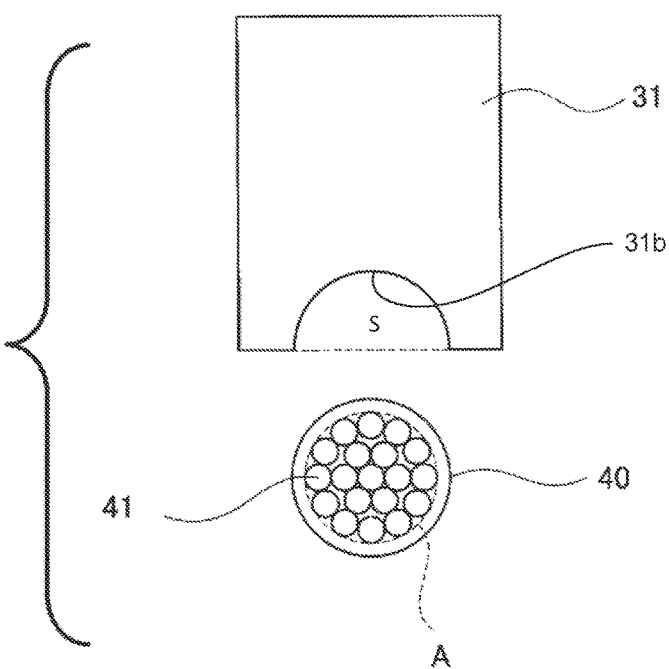
FIG. 8 is a schematic side view that shows the relation of a concave part of the horn and the conductor part of an electric wire according to one embodiment, where a cross section of the concave part is semi-circular shaped.
Figure 9:
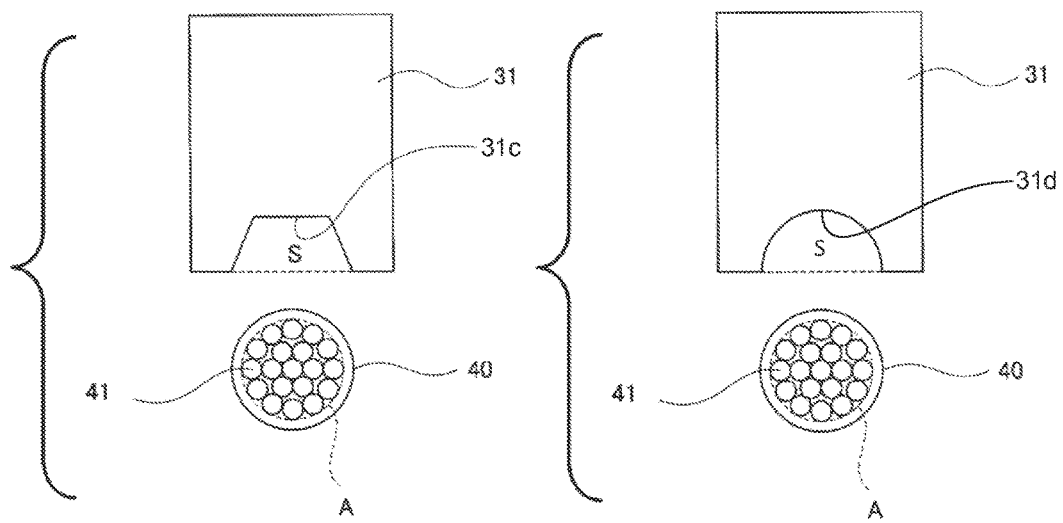
FIG. 9 is a schematic side view that shows the relation of a concave part of the horn and the conductor part of an electric wire according to one embodiment, where the concave part is trapezoidal shaped in one cross section, and the concave part is semi-circular shaped in another cross section.

Although the invention has been described based on the embodiments, the invention is not limited to the above embodiments, and modifications may be made without departing from the scope and spirit of the invention. For example, in the embodiment, the cross-section of the concave part 31a is trapezoidal, but not only a trapezoidal shape in particular, the concave part 31a may have other shapes such as in FIG. 8, a semi-circular shaped concave part 31b. Further, the shape of the cross-section does not need to be uniform in the longitudinal direction of the electric wire. For example, as in FIG. 9, the shape may be a trapezoidal shaped concave part 31c in a certain cross-section, but is a semi circular shaped concave part 31d in another cross-section.

What is claimed is:

1. An ultrasonic jointing method for performing an ultrasonic joint of a conductor part which is exposed by removing a coating of an electric wire with respect to a terminal, the ultrasonic jointing method comprising:
    holding the conductor part of the electric wire and the terminal between an anvil and a horn in which a concave part is formed; and
    applying an ultrasonic vibration to the conductor part of the electric wire and the terminal that are held between the anvil and the horn,
    wherein the conductor part is received in the concave part which has a space area of 0.89 to 1.46 times as large as a cross-sectional area of the conductor part of the electric wire.

2. The ultrasonic jointing method according to claim 1, wherein the terminal has a flat-plate shape that excludes sidewalls for restricting movement of the conductor part on a surface that faces the conductor part of the electric wire.

3. The ultrasonic jointing method according to claim 1, wherein the concave part has, in cross-section, either a trapezoidal shape or a semicircular shape.

4. The ultrasonic jointing method according to claim 1, wherein the concave part has a trapezoidal shape in one cross-section and a semi-circular shape in another cross-section.

5. The ultrasonic jointing method according to claim 1, wherein the concave part has a cross-section comprising a semi-circular shape.

6. The ultrasonic jointing method according to claim 1, wherein the concave part has a cross-section comprising a trapezoidal shape.

\* \* \* \* \*